Feb. 13, 1934.  G. NAPOLITAN  1,947,272
VEHICLE BRAKE
Filed Sept. 9, 1932  3 Sheets-Sheet 2
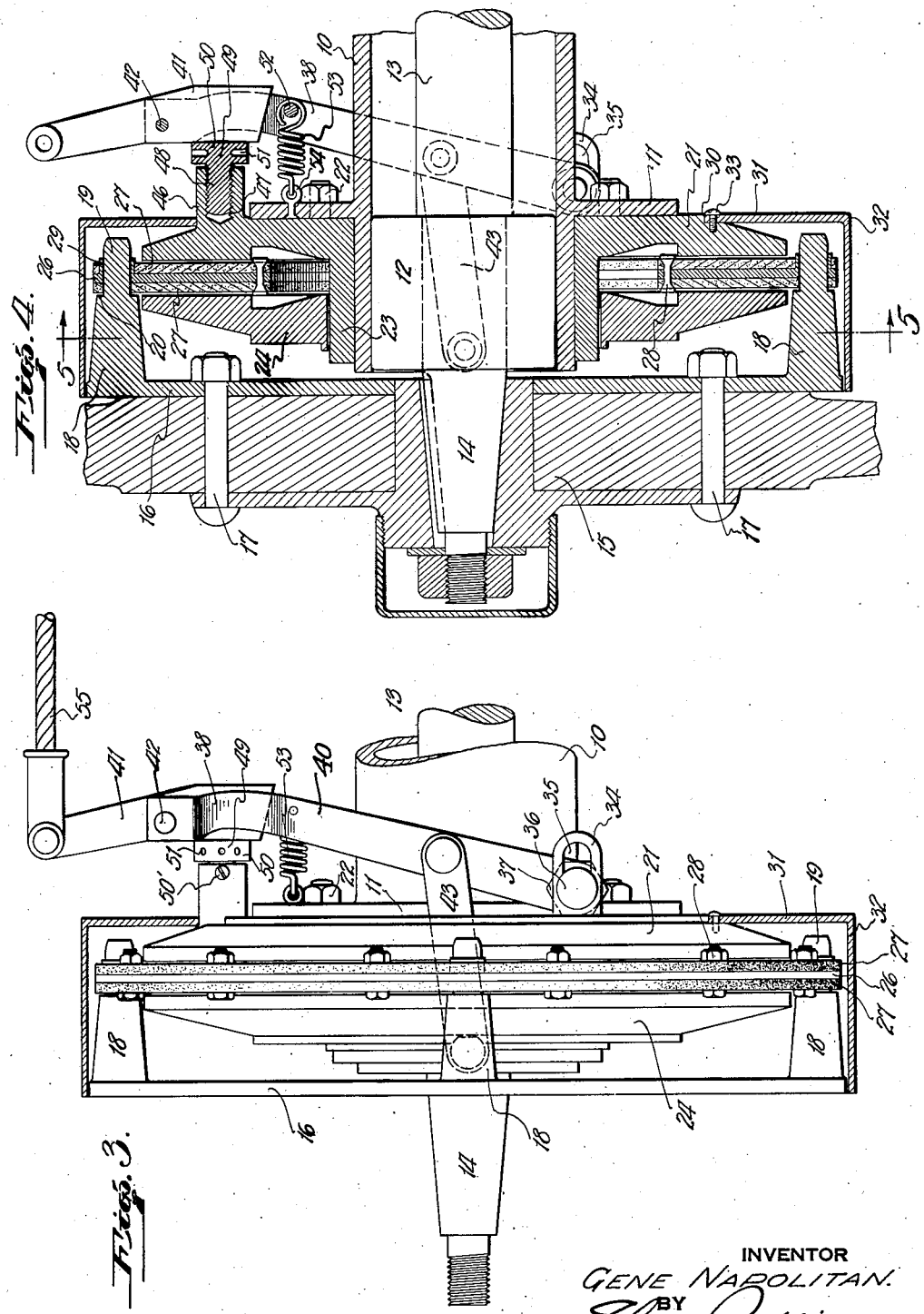
INVENTOR
GENE NAPOLITAN.
BY
ATTORNEYS Feb. 13, 1934.   G. NAPOLITAN   1,947,272
VEHICLE BRAKE
Filed Sept. 9, 1932   3 Sheets-Sheet 3
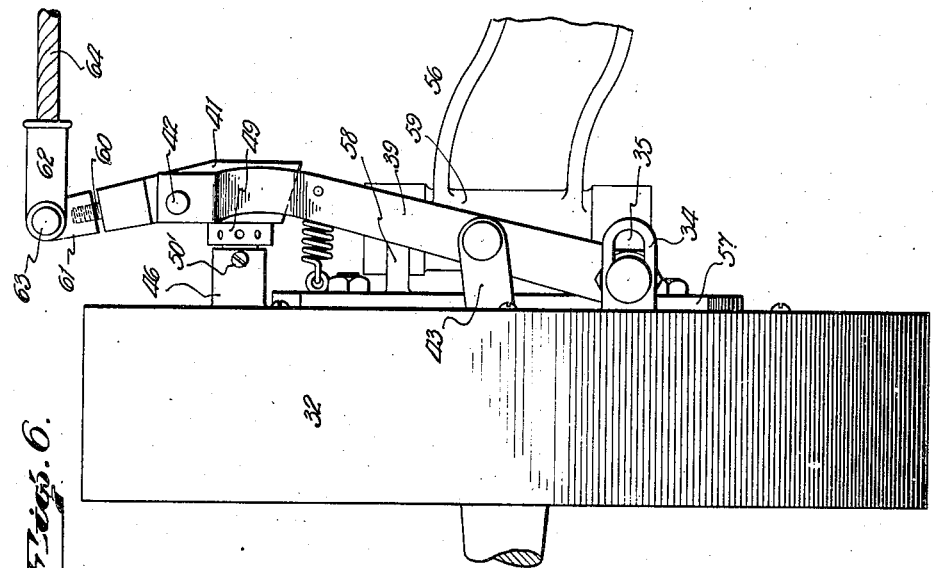
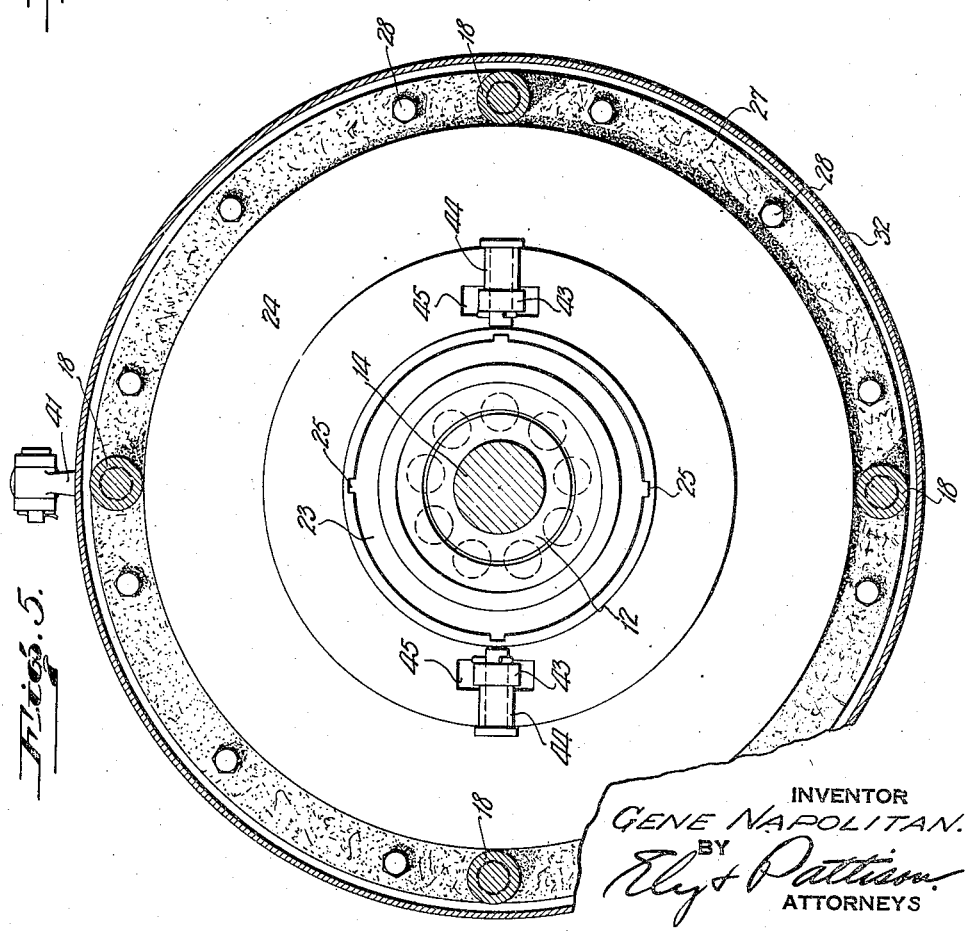
INVENTOR
GENE NAPOLITAN.
BY
ATTORNEYS Patented Feb. 13, 1934

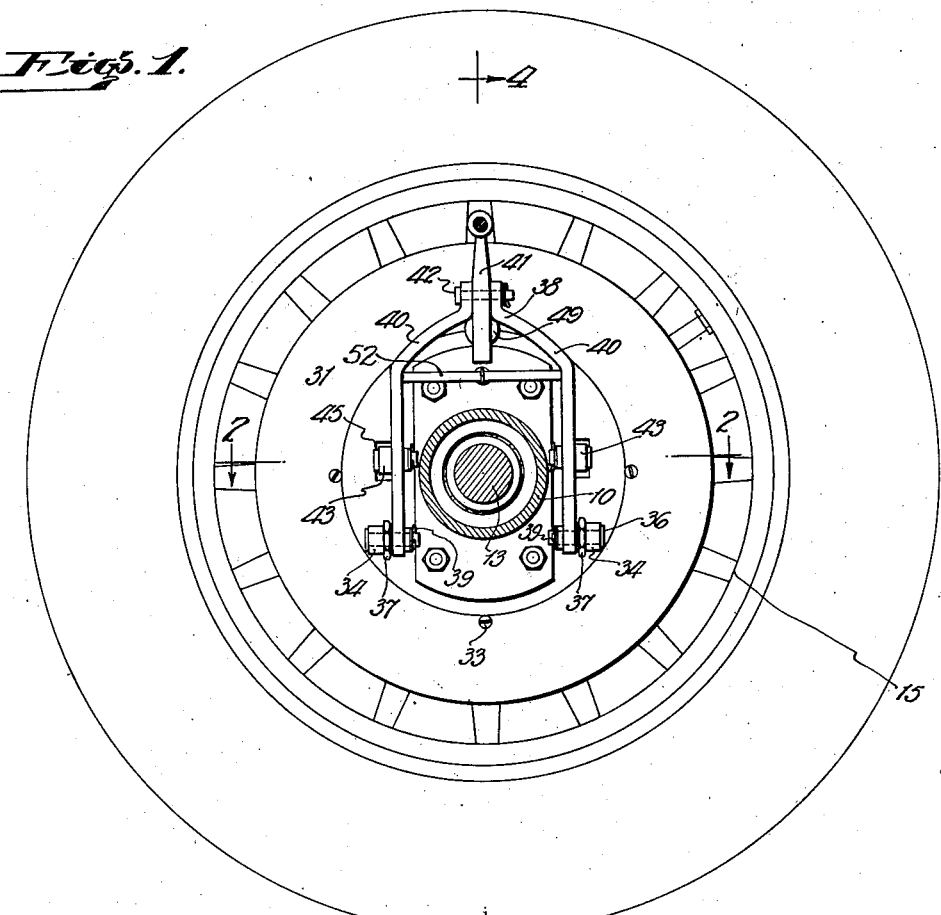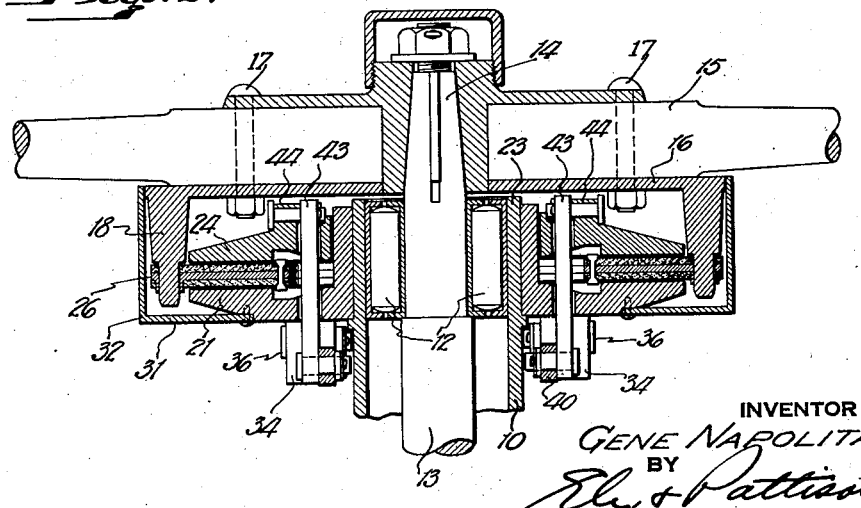

1,947,272

UNITED STATES PATENT OFFICE 1,947,272

VEHICLE BRAKE

Gene Napolitan, Brooklyn, N. Y.

Application September 9, 1932. Serial No. 632,324

5 Claims. (Cl. 188—72)

This invention relates to vehicle brakes and is an improvement over the construction set forth in my copending application, Serial No. 525,264, filed March 25, 1931.

The objects of this invention are broadly similar to those stated in the above mentioned application, namely to provide a vehicle brake of the disk type for obtaining a powerful and positive braking action by the application of low pedal pressure. The improvements in this invention over my prior construction resides in compact assembly of the parts, and the easy adjustability of the actuating mechanism to compensate for the wearing of the friction brake elements and their coacting parts.

Another feature of the invention is the provision of a vehicle brake embodying an actuating mechanism including an operating lever which may be adjusted to compensate for any lost movement caused by wear of certain operating parts.

A further feature of the invention is the provision of a brake in which a friction ring floats between a fixed or stationary plate and a movable plate, the stationary plate serving to close one of the open sides of the brake housing for excluding dust and dirt therefrom.

A still further object is to provide a vehicle brake of the disk type which is simple and inexpensive of construction, easy of operation, and in which all of the working parts are accessible for repair or replacement by a minimum amount of time and labor.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a vertical transverse sectional view through the rear axle assembly of an automobile showing my invention in side elevation.

Figure 2 is a horizontal sectional view on the line 2—2 of Figure 1.

Figure 3 is a vertical sectional view through the brake housing showing the working parts in elevation.

Figure 4 is a vertical transverse sectional view on the line 4—4 of Figure 1.

Figure 5 is a vertical sectional view on the line 5—5 of Figure 4.

Figure 6 is a side elevational view showing the invention as applied to a front axle assembly.

Referring to the drawings by reference characters and especially to Figures 1 to 5, inclusive, the numeral 10 designates a portion of the rear axle housing of a motor vehicle, the same being provided with an annular flange 11 inward of one end thereof. Extending through the axle housing 10 and journaled in bearings 12 therein is a rear axle 13, the spindle 14 of which extends beyond the end of the housing 10 and has an automobile wheel 15 mounted thereon. The wheel 15 is spaced from the flange 11 to accommodate the brake mechanism now to be described.

Fixedly secured to the inside of the wheel 15 is a rotatable plate 16, the same being turnable with the wheel as it is fastened thereto by bolts or like fastening elements 17. Extending inwardly from the rotatable disk plate 16 and radially arranged therearound as best seen in Figure 5 of the drawings, are posts 18, the outer ends of which are reduced to provide pins 19 and shoulders 20. The posts 18 extend inwardly from the disk plate 16 adjacent the peripheral edge thereof.

Fitting against the outer face of the flange 11 is a stationary braking disk plate 21, the same being fixedly secured to the flange by bolt and nut means 22, thus it will be seen that the plate 21 is fixed and held against rotation The disk plate 21 is provided with an outwardly extending hub portion 23 which encircles the outer end of the axle housing 10, while mounted on the hub portion for sliding movement is a movable braking disk plate 24. The plate 24 is keyed to the hub portion 23 as at 25 and best seen in Figure 5 of the drawings.

Interposed between the stationary and movable braking plate is a friction disk element comprising a disk plate 26 having flat friction rings 27 secured to opposite sides thereof and which friction rings may be riveted or otherwise secured as shown at 28. The inner faces of the stationary ring 21 and movable ring or plate 24 are shaped to form a space or cavity therebetween and the fastening elements or rivets 28 are disposed inward of the plane of the braking surfaces of the respective braking plates. The friction element is of a diameter greater than the diameter of the stationary and movable braking plates and is formed with bearings or collars 29 beyond the plane of the periphery of the braking plates for receiving the respective pins 19 of the posts 18. Thus it will be seen that the friction element is rotatable with the plate 16 and is free to move laterally between the braking plate so that when the movable plate 24 is moved in a direction toward the stationary plate 21, a braking action will result between the respective braking plates and the opposite sides of the friction element.

The outer side of the stationary disk plate 21 is formed with a shoulder 30 which receives the walls of an opening in the inside wall 31 of an annular casing 32. The casing is secured to the stationary plate by screws or other like fastening elements 33. The casing 32 is of a diameter to snugly fit about the rotatable disk plate 16, and the said disk plate serves to close one side of the casing while the stationary plate 21 serves to close the opposite side of the said casing for the purpose of excluding dust and dirt from the interior thereof.

Extending outwardly from the stationary disk plate 21 are opposed ears 34 provided with horizontally disposed elongated slots 35. Extending through the slots 35 of the ears 34 are the threaded shanks of headed pins 36 and which pins may be clamped in various positions along the length of the slots by clamping nuts 37 which are threaded to the shanks of the threaded pins. The extreme free ends of the pins remain unthreaded and receive the free ends of a yoke lever 38. Cotter pins or the like 39 extend through openings in the ends of the pins 36 to retain the ends of the yoke lever in pivotal engagement with the pins 36.

The yoke lever 38 is formed of a pair of yoke arms 40, and interposed between the adjacent ends of yoke arm or at the bight portion of the yoke lever, is a fulcrum or actuating lever 41. The lever 41 is pivoted to the ends of the arms forming the yoke lever as at 42, thus it will be seen that the fulcrum of actuating lever 41 pivots between the arms forming the yoke lever 38.

A pair of links 43 have one of their ends pivotally connected to the arms 40 of the yoke lever, while the opposite ends of the link are pivotally connected to bearings or ears 44 extending from the outer side of the movable plate 24. The said plate 24 is provided with slots 45 for the passage of the links 43. From the description thus far, it will be seen that when the yoke lever 38 is moved outwardly, the same will impart a pull upon the link 43 which movement will in turn slide the movable disk plate 24 in a direction toward the stationary plate 21, thus setting up the braking action between the plates 24 and 21 and the interposed friction disk plate.

Extending outwardly from the stationary disk plate 21 and beyond the side walls 31 of the casing 32 is a boss or collar 46, the same being provided with an internally screw threaded bore or socket 47 for threadedly receiving the threaded shank 48 of an adjustable stop member 49. An enlarged head 50 is provided on the outer end of the shank 48 and the peripheral face of the head is provided with radially disposed sockets or recesses 51 for the insertion of a tool to enable the turning of the stop member to effect an adjustment of the same. The stop member is so positioned that the head is disposed in the path of movement of the yoke lever 38 and the fulcrum lever 41 so as to act as a stop for the levers in the direction toward the stationary disk plate 21.

A cross bar 52 extends between the yoke arm 40 and serves as a support for one end of a coil spring 53, the opposite end of said spring being fixedly connected to the flange 11 of the axle housing as at 54. Thus it will be seen that the spring 53 tends to normally move the yoke lever 38 in a direction toward the stationary plate 21 and against the adjustable stop member 49.

Pivotally connected to the upper free end of the fulcrum lever 41 is a pull cable 55 which leads to the foot actuated pedal of the motor vehicle (not shown in the drawings).

From the foregoing description, it will be seen that a pull upon the pull cable 55 will tend to actuate the fulcrum lever 41, the lower end of the same bearing against the adjustable stop member 49 and fulcruming against the head of the same and which movement of the fulcrum lever moves the yoke lever 38 in a direction away from the stationary disk plate 21, causing the links 43 to pull the movable disk plate in a direction toward the stationary disk plate and thus set up a braking action between the two disk plates and the interposed friction disk member. This action is of course exerted against the tension of the spring 53. Upon release of the pull cable 55, the spring 53 will return the parts to their normal inoperative position.

In time, the friction rings will become worn, which ordinarily reduces the power or efficiency of the brakes. This wear between the parts may be easily and readily taken up by loosening the nuts 37 on the pivot pins 36, and adjusting the said pins in the slots 35 of the ears 34 so as to change the pivotal axis of the yoke lever 38. This adjustment will cause the movable disk plate 24 to be disposed closer to the stationary disk plate 21, thus requiring a shorter distance of travel during movement of the movable disk plate to braking action. When the pivotal axis of the yoke lever is adjusted to compensate for wear between the parts, the adjustable stop member 49 is also adjusted to proportionately limit the movement of the yoke lever and the fulcrum lever against the action of the spring 53. It will thus be seen that a simple and readily accessible means is provided for compensating wear between the working parts of the brake mechanism in order that the efficiency of the brake may be maintained during life of the same.

In Figure 6 of the drawings, substantially the same construction is shown as that in the previous figures with the exception that the brake mechanism is associated with the front axle 56 of a motor vehicle in which the stationary plate 21 is formed with an extending flange 57 disposed beyond the casing 32. Ears 58 extend from the flange 57 and pivot on the knuckle 59 of the front axle 56. This construction is necessary to enable the brake mechanism to turn with the front wheels of the vehicle. Also in this construction the fulcrum lever 41 has its upper end provided with a threaded stud 60 for threadedly receiving an ear 61 to which a socket member 62 is pivoted as at 63. A pull cable 64 has one of its ends fixed within the socket member 62. This construction facilitates the actuation of the fulcrum and yoke levers irrespective of the angular position of the brake mechanism caused by the turning of the front wheels of the vehicle.

For the purpose of locking the adjustable stop member 49 in a set position, a set screw 50' is threaded through the boss or collar 46 for bearing engagement with the threaded shank 48 of the said stop member.

While I have shown and described what I deem to be the most desirable embodiment of my invention, I wish it to be understood that certain changes as come within the scope of the appended claims may be resorted to if desired.

Having thus described the invention, what I claim as new and desire to secure by Letters Patent, is:—

1. In a brake mechanism having a stationary plate, a movable plate, and a friction plate interposed between said stationary plate and said movable plate, lever actuated means for moving said movable plate in a direction toward said stationary plate, said lever actuating means including a pivoted yoke lever, an actuating lever pivoted to said yoke lever, a stop extending from said stationary plate, and spring means acting upon said yoke lever to normally cause the same and one end of said actuating lever to abut said stop whereby the abutting end of said actuating lever may fulcrum against said stop upon the exertion of a pull upon the opposite end of said actuating lever to move said yoke lever to operating position against the action of said spring means.

2. In a brake mechanism having a stationary plate, a movable plate, and a friction plate interposed between said stationary plate and said movable plate, lever actuated means for moving said movable plate in a direction toward said stationary plate, said lever actuating means including a pivoted yoke lever, an actuating lever pivoted to said yoke lever, an adjustable stop carried by said stationary plate movable toward or away from said yoke lever and disposed in the path of movement thereof in one direction, and spring means acting upon said yoke lever to normally cause the same and one end of said actuating lever to abut said stop whereby the abutting end of said actuating lever may fulcrum against said stop upon the exertion of a pull upon the opposite end of said actuating lever to move said yoke lever to operating position against the action of said spring means.

3. In a brake mechanism, the combination of a stationary braking element and a movable braking element, a yoke lever pivoted to said stationary braking element, links connecting the respective arms of said yoke lever to said movable braking element, an adjustable stop member carried by said stationary braking element, and disposed in the path of movement of said yoke lever in one direction, and spring means acting upon said yoke lever to normally urge the same into abutting engagement with said stop member and to cause said movable braking element to move in a direction away from said stationary braking element.

4. A vehicle brake comprising a stationary plate having a hub portion, a spaced rotatable plate adapted to be fixedly mounted upon a vehicle wheel, a movable disk plate slidably and non-rotatably mounted upon said hub portion, a friction disk plate interposed between said stationary disk plate and said movable disk plate and being of a greater diameter than the adjacent disk plates, the extending portion of said friction disk plate having spaced openings therein, pins extending from said rotatable disk plate, said pins extending through said openings and provided with shoulders for limiting sliding movement of said friction disk toward said movable disk plate when in normal released position, manually actuated means for moving said movable disk plate toward said stationary disk plate, and spring means acting to normally hold said actuating means in release position.

5. A vehicle brake comprising a stationary plate having a hub portion, a spaced rotatable plate adapted to be fixedly mounted upon a vehicle wheel, a movable disk plate slidably and non-rotatably mounted upon said hub portion, a friction disk plate interposed between said stationary disk plate and said movable disk plate and being of a greater diameter than the adjacent disk plates, the extending portion of said friction disk plate having spaced openings therein, pins extending from said rotatable disk plate, said pins extending through said openings and provided with shoulders for limiting sliding movement of said friction disk toward said movable disk plate when in normal released position, manually actuated means for moving said movable disk plate toward said stationary disk plate, said manually operated actuating means including a yoke lever pivoted to said stationary disk plate, links pivotally connected to the arms of said yoke lever and to said movable disk plate, and spring means acting upon said yoke lever to normally hold the same in released position.

GENE NAPOLITAN.